(12) United States Patent
Allen

(10) Patent No.: US 8,161,014 B1
(45) Date of Patent: Apr. 17, 2012

(54) SYSTEM AND METHOD FOR USER FILE ACCESS AND TRACKING

(75) Inventor: Eugene Bradley Allen, Magnolia, TX (US)

(73) Assignee: ByStorm Software, LLC, Magnolia, TX (US)

( * ) Notice: Subject to any disclaimer, the term of this patent is extended or adjusted under 35 U.S.C. 154(b) by 0 days.

(21) Appl. No.: 11/689,417

(22) Filed: Mar. 21, 2007

(51) Int. Cl.
G06F 7/00 (2006.01)
G06F 17/00 (2006.01)
G06F 17/30 (2006.01)
(52) U.S. Cl. .................... 707/694; 707/785
(58) Field of Classification Search .......... 707/9, 785, 707/694
See application file for complete search history.

(56) References Cited

U.S. PATENT DOCUMENTS

| 6,038,563 | A | * | 3/2000 | Bapat et al. | 707/10 |
| 6,236,996 | B1 | * | 5/2001 | Bapat et al. | 707/9 |
| 7,032,026 | B1 | * | 4/2006 | Biswas et al. | 709/229 |
| 2004/0022390 | A1 | * | 2/2004 | McDonald et al. | 380/277 |
| 2004/0039741 | A1 | * | 2/2004 | Benson et al. | 707/9 |
| 2004/0236747 | A1 | * | 11/2004 | Swimmer et al. | 707/9 |

* cited by examiner

*Primary Examiner* — Angela Lie
*Assistant Examiner* — Kris Mackes
(74) *Attorney, Agent, or Firm* — Timothy W. Johnson

(57) ABSTRACT

A system and method for managing user access to objects in a computer system when a request to access the object is received. The user, operation and object are identified and matched against one or more Venn relationship rules to determine if they match any of the rules.

6 Claims, 7 Drawing Sheets

Fig. 7

SYSTEM AND METHOD FOR USER FILE ACCESS AND TRACKING

CROSS-REFERENCE TO RELATED APPLICATIONS

This application claims the benefit of U.S. Provisional Application No. 60/775,376, filed Mar. 21, 2006.

TECHNICAL FIELD

The present invention relates to tracking user access to file in a computer file system including file auditing and security in a computer file system such as the Windows 2000 based operating systems.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers.

FIG. 7 is an interface of a preferred embodiment according to the invention showing a log of activity.

FIG. 8b is an interface of a preferred embodiment according to the invention showing the advanced rule settings for the rule being created in FIG. 8a.

DETAILED DESCRIPTION OF EMBODIMENTS OF THE INVENTION

Figure 1:
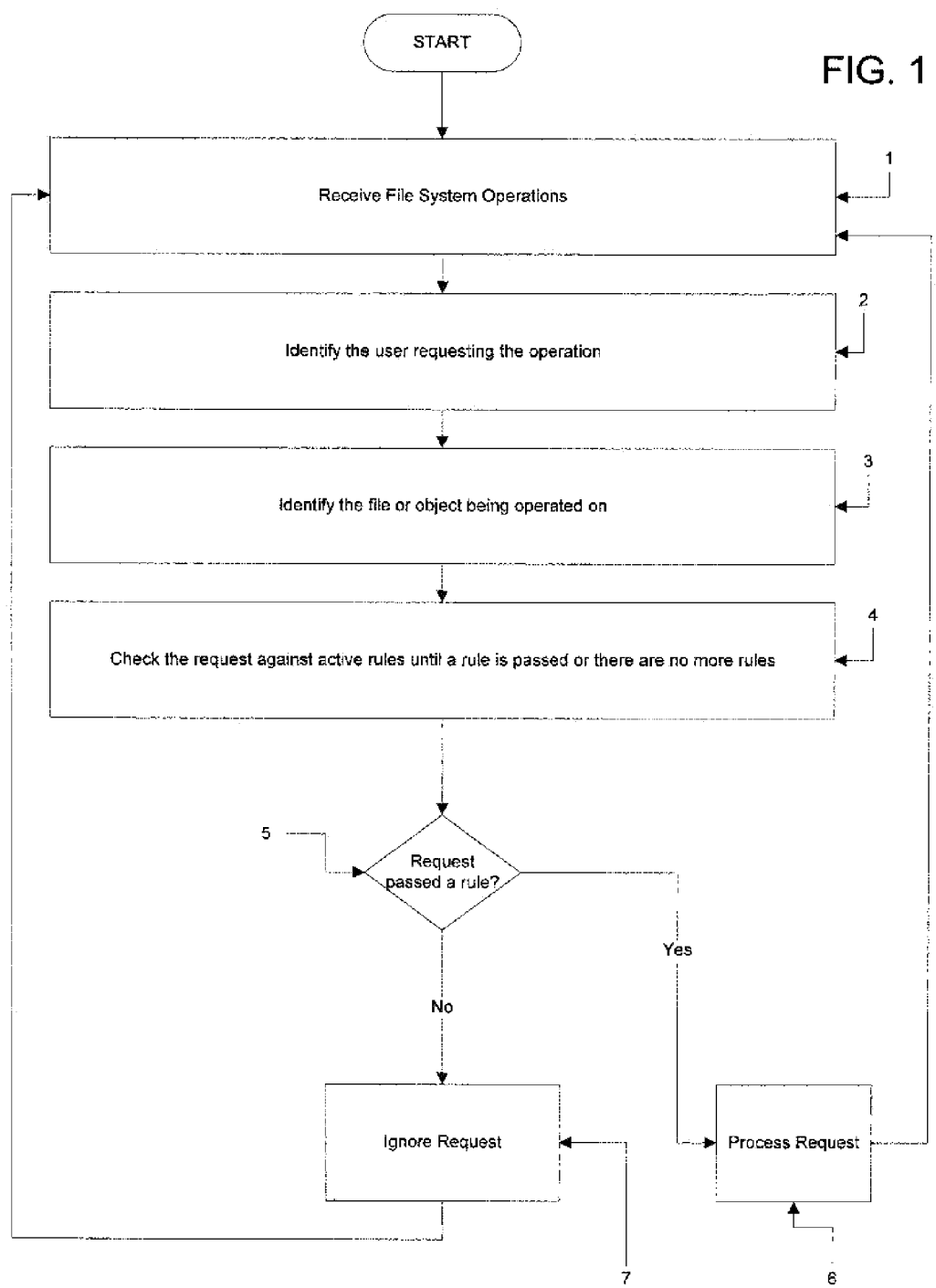
FIG. 1 is a flow chart of a preferred embodiment according to the invention.

There is a need to efficiently and effectively implement rules for accessing files in a computer file system and to audit and track the operations by users on files in a computer file system. Rules for accessing, auditing and tracking files use sets of information. Preferably, the information includes who is or seeks to operate on a file, which file or object is being operated upon, and what operation is being or is attempting to be performed on the file or object. The auditing and tracking would also include when did all of this occur. Furthermore, within these sets are multiple attributes that can also serve to expand or limit the rule.

As used herein "Auditing" or "audit" means the recording of information related to a request to access an object in a computer system.

"Track" or "tracking" means the recording and displaying of information related to a request to access an object in a computer system.

"Object" as used herein means any type of computer resource or peripheral that can be accessed by a user or an application being executed. Examples of objects or files in a file system, printers, scanners, etc.

"Venn Relationship" as used herein means the intersection if any between the sets of information used to define a rule.

The sets of information described herein can be operated on using set type operations or abstractly applying Venn Diagrams to determine Venn relationships which are used to identify whether a given attribute or element is found within the intersection of all sets thereby passing the rule. Venn diagrams are geometric figures used to illustrate sets and set relations. Generally, a rectangle is used to represent the universal set, and circles are used to represent subsets of the universal set. Venn diagrams are useful for illustrating set operations like "OR", "AND", or "NOT".

For example the entire computer file system, all users, all files and all of the operations that are available, is the universal set at a given time. Then a set of files can be defined as all Excel™ spreadsheet files, a set of operations can be defined as all file writes and a set of users can be defined as all users with a name starting with "G". The Venn diagram that would show the intersection of all three sets would be written as "all users with a name starting with the letter "G" doing a file write on any Excel™ spreadsheet file".

Using Venn relationships and the description of such relationships enables operations on large sets of data because inclusion in the set is based on an attribute of the set member. This enables "atomic on-demand" checks like a security check on a certain file or whether a certain operation should be audited or not. Because any set member can be identified by an attribute, rules are not limited to file names or user names. Rather any attribute of a file can be used, such as date of creation, location, file type, size, etc. Attributes other than a user name can also be used and would only be limited by the attributes and information collected and available in a computer system. The larger the user profile the more attributes that are available to be used in the rule making. It is the same for any object in the system that has attributes.

A rule must be defined such that it will result in showing inclusion or exclusion from a set. File names and the like can be described using the common wildcard symbols "*" and "?". For example the "*" represents 0 or more characters and "?" represents a single character from a set of characters.

In a preferred embodiment according to the invention, all computer file accesses are intercepted or hooked by a process executing on the computer so that each file access can be tested against the defined rule models.

Here is an example of a set of attributes that can be used in testing for inclusion in a set:

1. Operation type: predefined set include Open for Read, Open for Write, Open for Delete, Read, Write, Set Security, Rename and Delete;
2. File name: Standard wildcard match on full name. Here are some examples:
   "*.xls" all files ending with an xls extension;
   "*\temp\*.*" all files under a "temp" directory;
   "*.*" all files;
   "*\G*.*" all files starting with the letter G;
   "C:\*" all files on the C Drive;
3. User Name: Standard wildcard match on username. Here are some examples:
   "*" all users;
   "G*" all users with a username starting with the letter G;
   "*allen" all users with "allen" at the end of their username; and/or
4. Group Names: Standard wildcards match on group name. Users will be included if they are members of the group that has a name that matches the wildcard. For example, "*" will include members of all groups and "Domain Admins" will include members of the Domain Admins group, while "Accounting" will include members of the Accounting group.

FIG. 1 is a flow chart of a an embodiment according to the invention. A computer system has an operating system such as Windows NT™, Windows 2000™, Linux, etc., and a file system which is responsible for enabling File System Operations which may include creating, opening, closing, reading, writing, etc., files in the computer file system. As seen in step 1, a File System Operation is received. The user making the request is identified in step 2. The file upon which the request is made is identified in step 3. The request is then checked against the current active rules in step 4 until the request passes a rule or there are no more rules. The decision tree 5 determines whether or not the request has passed an active rule. The presumption in the system according to the invention is that all file access are allowed unless a certain rule is passed. Therefore under the system all rules are written to be deny rules such that if the current request falls within the intersection of all sets of data for the defined Venn relationship in the rule, then the request passes the rule and results in a denial of the request by the system. If the request passes any rule then it is processed as in step 6 and no further checks against the remaining rules is necessary. If the request does not pass any rules then the request is ignored as in step 7.

Figure 2:
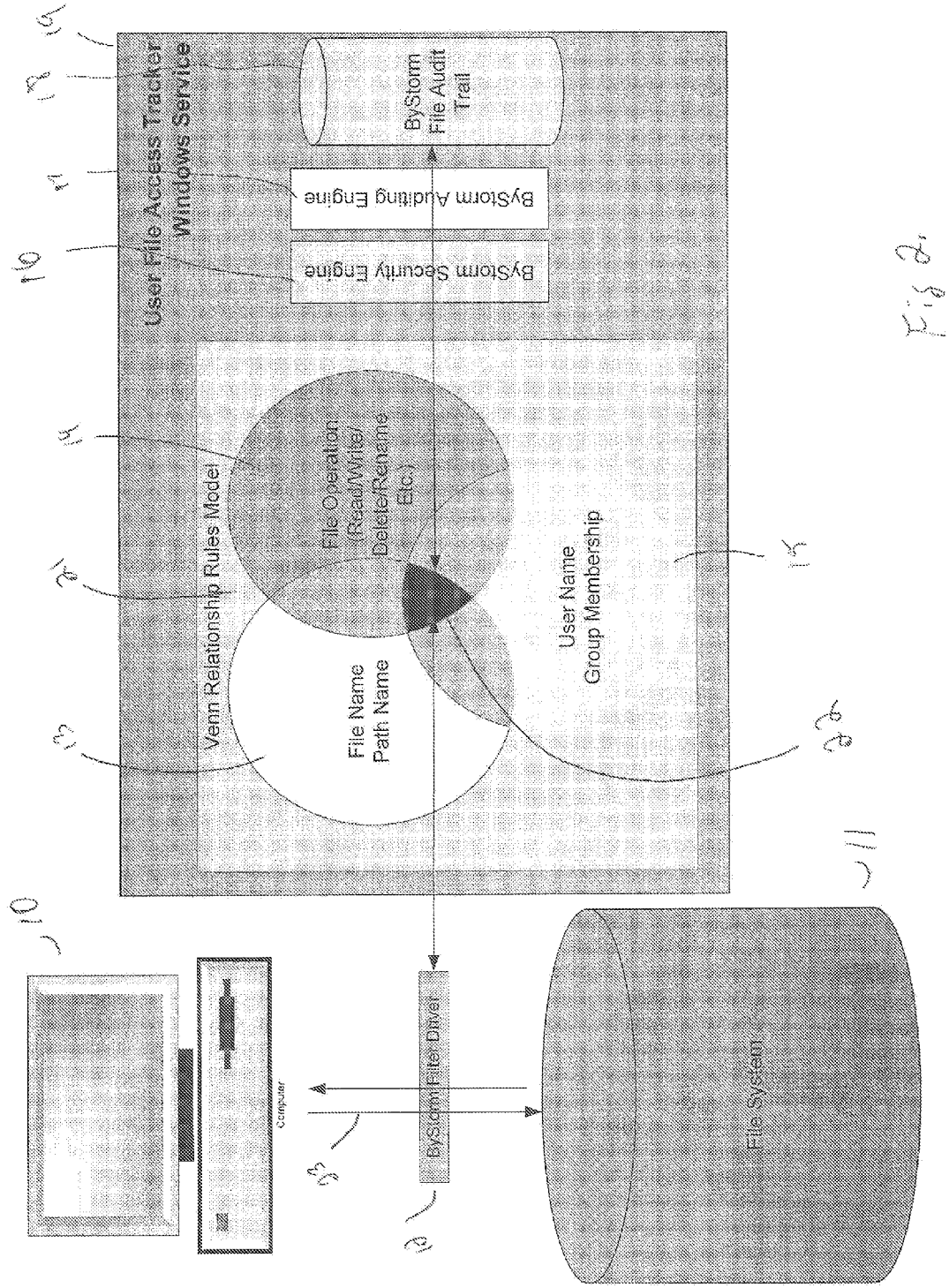
FIG. 2 is a chart of a system according to the invention.

In a preferred embodiment according to the invention as set forth in FIG. 2, a computer system 10 is running a Windows 2000 based operating system such as Windows 2000™, or Windows XP™. A Windows 2000 based operating system has the capability of using an Installable File System (IFS), which allows software processes such as Virus Scanners and on-the-fly encryption software packages to appear to be part of the actual operating system.

By utilizing the IFS, Independent Software Vendors are able to write software that can intercept and operate on file data before or after the hardware receives it such as ByStorm Filter Driver 12. For example, a virus scanner intercepts all file reads and scans the contents for viruses before allowing the requesting application to receive it. An on-the-fly encryption package will intercept file READs after the operating system has read the data, intercepting the file WRITE BEFORE the operating system has written it. This is encrypting on the WRITE command and decrypting on the READ.

In a preferred embodiment according to the invention, file operations are intercepted by filter driver 12 before the file system 11 receives them. Thereafter, WHAT file or object is being operated on which is a member of Venn relationship set 13; WHO is asking for the operation to be performed which is a member of set Venn relationship set 15; and the operation that is being performed (WHY) which is member of Venn relationship set 14; is determined. The Security Engine 16 tests the information against each Venn Relationship Rules Model 21 to determine if it is found within the intersection 22 of the Venn Relationship sets 13, 14, and 15. If it is found within the intersection 22, then the file request will be denied by the Security Engine 16 and the Filter Driver 12 will not pass the request to the file system 11.

In a preferred embodiment according to the system, each request 23 is also passed to the Auditing Engine 17 which maintains a set of Venn Relationship Rules for determining whether a request 23 should be audited and recorded in the audit trail 18. The Auditing Engine 17 tests the request 23 against each Audit Venn Relationship Rules Model 21 to determine if it is found within the intersection 22 of the Audit Venn Relationship sets 13, 14, and 15. If it is found within the intersection 22, then the file request will be audited and information relating to the file access including the user making the request, the file being accessed, the type of access, and the date and time will be recorded and logged in the File Audit Trail 18.

Because each file access request is being intercepted, stability and performance is an issue that needs to be addressed. In the preferred embodiment part of the system is using the Installable File System mechanism within Windows 2000, which means that it will be considered as part of the operating system. Of all the Windows sub-systems to HOOK into, the file system can be risky.

Nearly every task performed in the Windows™ operating system requires a file access. To mitigate against crashing the operating system, in a preferred embodiment the application is divided into a module that hooks into the operating system to intercept the file system access requests a module that runs as a service or as a user level process to perform some of the tasks and a user level console that is used to create rules and interface with service module.

Performance in a normal operating environment is also an issue. Operating system such as Windows™ continually access files in order to maintain the executing processes. In other words, nearly everything that happens in Windows™ uses a file and uses them often.

If the computer system intercepts every call to the file system and the executing module involved does not perform well, the entire system will begin to run much less efficiently. For example, if a million file accesses were delayed as little as a 0.25 seconds, these million files accessed would take 250, 000 extra seconds. 250,000 seconds is almost 3 days.

To address both stability and performance according to the invention, in a preferred embodiment, the modules are divided into two executing modules.

In the file system "hook" code also known as the Filter Driver, that runs as part of the Operating System:
 a. File system operations are intercepted;
 b. The user requesting the operations is identified;
 c. The file(s) being operated on is identified;
 d. the current date and time is recorded;
 e. packages all this data up and sends it to the User level module; and
 f. Then it waits (for up to 0.2 seconds) for the User level module to return whether or not the call should be denied or not. In a preferred embodiment, auditing and tracking is also performed on the requests.

In a preferred embodiment under a Windows™ based operating system, the User level module executes as a Windows™ service, the "Service, that waits and processes intercepted file requests. In a preferred embodiment according to the invention, the User level module:
 a. Implements the Venn relationship rules system;
 b. Each intercepted file request is tested against the rules system and if the request passes, is processed based on the type of rule that was passed.
 c. In a preferred embodiment, provides an interface for an external program to use for configuring the rules, the service and extracting data from the service including generating a file auditing report on file based on a start and end date constraint;
 d. In yet another preferred embodiment, connects to the configured domain to gather group membership to be used for group membership rules; otherwise group membership rules are not used; and
 e. In yet another embodiment according to the invention, implements the encrypted and compressed data store for file auditing data.

In a preferred embodiment, the Filter Driver intercepts each file request and sends it to the Service. It then waits for the Service to process it and return whether or not the Filter driver should allow or deny the file request. For performance enhancement only security rules are handled in real time. Therefore, only the rules which will deny a request are tested. The request is packaged and put into an auditing queue for processing during computer system idle time.

The Service "listens" for incoming raw file requests coming from the Filter driver. When a file request the execution and information flow as follows:
1. the raw request is added into an internal queue;
2. if it is a File Create/Open or Set Security request the Service checks the rules to see if it should be denied.
3. Tells the Filter driver to allow or deny the request, which in turn instructs Windows™ to accept or cancel the file request.

By keeping this "listening" code compact and minimal, the system according to the invention can keep the computer operating at close to maximum efficiency. The preferred embodiment pushes off the actual non-real time (e.g. auditing) processing to be handled at a less critical time, such as when the filter driver is NOT waiting on either the user or the program itself to allow it to continue.

In a multi-threaded computer operating system such as Windows 2000™ based system, the Service is also running several threads allowing it to perform other tasks concurrently with servicing requests from the Filter Driver. The following is an example of threads used within the Service within a preferred embodiment:
1.) Multiple threads are created to process incoming requests from the Filter driver adding the file requests to an internal queue;
2.) A thread is created to process the raw file requested added by the multiple file requests threads
  a. this thread
    i. pulls the raw requests off the internal queue;
    ii. processes them against the rules model;
    iii. In auditing collapses them if necessary; and
    iv. In auditing and tracking writes them to a file storage for later consolidation;
  b. In auditing and tracking another low-priority thread is created that handles the consolidation of the audited records into a compressed, encrypted database;
3.) 1 low-priority thread is created to gather group membership from a configured domain; and
4.) 1 low-priority thread is created to generate a "heart-beat" pulse to the event log if enabled. The purpose of a heart-beat pulse is to record that the service is running. It is a security measure to inhibit the stopping of the service in order to do things without being audited.

In a preferred embodiment according to the invention the system is made up of 3 modules.

The first module is the File System Filter driver which is based on the Windows Installable File System features of Windows 2000™ based computer operating systems. The File System Filter Driver hooks into the Windows File system and intercepts all file operations. Many file operations are ignored, this preferred embodiment according to the invention checks for the following operations:
1. IRP_MJ_CREATE (for file and folder opens/creates);
2. IRP_MJ_READ (for file reads);
3. IRP_MJ_WRITES (for file writes);
4. IRP_MJ_SET_SECURITY (for file security changes);
5. IRP_MJ_SET_INFORMATION (for file and folder renames);
6. IRP_MJ_CLEANUP (for file deletes);

Information about these operations is packaged up and sent to the Windows Service for processing. For the 6 operations above, we "send" the package in the "Pre" completion routine except for IRP_MJ_CREATE and the IRP_MJ_SET_SECURITY with are sent in both the "Pre" and the "Post" completion routine. For each file operation, the following information is sent to the Windows Service
1. A "SentFromPreOperation" Boolean Flag;
2. The IRPflags from the file operation;
3. The Major and Minor file operation codes;
4. The Operation Flags;
5. The File Name;
6. The Volume Name;
7. The Share Name;
8. The File Extension;
9. The Stream Name;
10. The Final Component;
11. The Parent Directory;
12. The SID of the user performing the operation For impersonating routines, the SID is obtained via the SubjectContextToken. If that fails, it is attempted via the thread token. If that fails, it is finally attempted via the process token. If the SID was not gathered, the package is not sent.
13. The LockOperation;
14. The DeletePending flag;
15. The CancelDeletePending flag;
16. The Read/Write/Delete Access flags;
17. For IRP_MJ_CREATE operations, the Create options;
18. For File Renames operation, the Rename To Filename;
19. A flag for if the operation is on a file or a folder;
20. A flag for whether the object (file or folder, etc.) was created;
21. A flag for whether the operation was denied by the operating system or not; and
22. The path to the program that was used to request the operation.

An internal table is maintained to keep track of which SID opened a file allowing the system to determine the SID in non-impersonated routines.

When the Filter Driver starts up, it registers itself with the Windows 2000 based Filter manager which includes registering which operations will be processed. The internal SID table is allocated and initialized. A communications port for communicating with the Windows™ service is created.

When the Service module connects to the Filter Driver, a Port connect occurs and the process ID of the Service module is recorded. When the Service module disconnects the process ID is zeroed out. When the Filter Driver is unloaded the communications port is closed, the SID table is De-Allocated and the Filter module is unregistered.

Each time an instance of the Filter Driver is setup, all mounted volumes must be attached.

When an access request is received, the Process ID of the current thread is compared to the process ID of the Service module. If they are the same then the request is allowed without further processing. The Service module is not checked to determine if it has access to files.

Otherwise, all necessary information is packaged and sent to the Service module. The Filter Driver module then waits for a reply from the Service module indicating whether or not the file request should be allowed or not. If the reply times out, then allow the request. If the reply comes back as false, then cancel the file operation. Only file operations IRP_MJ_CREATES, IRP_SET_INFORMATIONs and IRP_MJ_SET_SECURITYs can be cancelled.

The Service module runs as a local system process and listens, processes and responds to packages sent by the file system Filter driver. The Service module exposes a COM interface for configuration and interaction by the Console module. The Service module registers an event log source for writing events to the event log. Entries into the log are written for the following events: 1) Service State Changes, i.e. startup, shutdown, etc.); 2) on the heart-beat pulse; 3) changes to the rules module; 4) rule matches; 5) configuration changes; and 6) bad rule data being loaded. The Service incorporates a "heart-beat" pulse that writes to the event log on a regular basis. The Service implements the rules model for processing the packages received from the Filter Driver and implements a security module for configuration changes. Therefore, every entry point into the COM object does a SecurityCheck on the calling user SID to determine if the call should be allowed or denied. Security is based on the calling user being a member of a local group.

Upon startup the Service module loads configuration information, and creates an event that will be signaled when a StopService event is received. It then creates the COM object and registers it. It creates two critical sections one for the rules model and one for the raw requests list. It creates a raw requests list, builds a translation table from NT volume names to drive letter mappings, loads group membership thread configuration, and in a multi-threaded environment creates a thread for gathering domain group membership information. The Service loads the rule model and the filter driver, connects to the communications port created by the Filter driver and creates an I/O Completion Port to monitor for packages. In a multi-threaded environment, the Service module creates one or more threads, preferably 10, to monitor for packages from the Filter driver and a single thread used to wait on the 10 monitoring threads during shutdown and cleanup. The main processing thread is created. The Service module also creates the heartbeat thread. When a StopService event is signaled then the Service module shuts down the heartbeat thread, shuts down the processing thread, unloads the filter driver, shuts down the monitoring thread, signals monitoring threads to exit and wait for the shutdown cleanup thread to exit; cleans up the communications ports, I/O completion ports, etc., and then exits.

In a multi-threaded operating environment such as Windows 2000™ based systems, the Service modules creates multiple threads to handle processing according to the invention. One thread is used to generate the heart-beat pulse every certain number of seconds, if configured to do so. One thread is used to load domain group membership every certain number of seconds, if configured to do so. Ten threads are used to process packages sent via the Filter driver. The following illustrates the flow of those threads (1) Wait for a package from the filter driver;
   (2) Enter the raw request critical section;
   (3) Build a "file request" object based on the package;
   (4) Add the "file request" to the end of raw request list;
   (5) If "File request" is a IRP_MJ_CREATE, IRP_MJ_SET_INFORMATION or IRP_MJ_SET_SECURITY call the "DenyAccess" virtual Method to determine if the filter driver should deny the request;
   (6) Exit the raw request critical section;
   (7) Build and return DenyAccess result to filter driver; and
   (8) goto step 1.

One main processing thread used to take action upon the queued packages. Here is the flow of that thread:

1. Wait for a "file request" to be in the raw request list;
   2. while the raw request is not empty
     a. Enter the raw request critical section;
     b. remove the top most file request object from the raw request list;
     c. Exit the raw request critical section;
     d. Normalize the file request
       i. Convert short path names to long path names;
       ii. Translate the volume names to drive letters;
     e. Check raw request again the rules model and return matching rule;
       i. Enter the rules model critical section;
       ii. For each active rule
         1. Generate a bit map for the operation of the raw request (each operation type having it's own bit);
         2. do a logical AND of the generated bit map and operation bit map of the rule
           a. if there is a match then perform a CHECKRULE for the current rule, the filename and the users SID;
           b. if CHECKRULE fails AND the raw request is a RENAME, perform CHECKRULE again for the current rule, the Rename TO filename and the users SID;
           c. if CHECKRULE succeeds, exit the rules model critical section and return matching rule;
           d. otherwise continue the loop;
       iii. Exit the rules model critical section;
     f. If raw request has a matching rule then process the request;
     g. Delete the raw request from memory;
     h. sleep for a short period of time preferably 2 seconds;
   i. repeat from step 1.

In a preferred embodiment, the Rule object has the following major methods—

(1) CheckForUserNameMatch—returns true if the user name passes a pattern defined in the User Name Wildcard check list and does not pass a pattern defined in the User Name Wildcard Checks Exclude list. Otherwise returns false.
   (2) CheckForGroupNameMatch—returns true if the user is a member of a group passing a pattern defined in the Group Name Wildcard check list and ISN'T a member of a group that passes a pattern defined in the Group Name Wildcard Checks Exclude list. Otherwise returns false.
   (3) CheckForFileNameMatch—returns true if filename passes a pattern defined in the File Name Wildcard check list and DOESN'T pass a pattern defined in the File Name Wildcard Checks Exclude list. Otherwise returns false.
   (4) ResponseMatch—return true if a logical AND between desired response and the rules Response type is not zero.
   (5) OperationMatch—return true if a logical AND between desired operation and the rules Operation type is not zero.

In a preferred embodiment the major functions used in the Service module are i. CHECKRULE receives as a parameters a rule, a filename and a user's SID and then goes through the following:
   (1) resolve filename to a drive type;
   (2) check the rule for a drive type match
     (a) if they don't match return FALSE;
   (3) check the matching rule for a filename match
     (a) if they don't match return FALSE;
   (4) Resolve the raw requests SID to a user name;
   (5) check the matching rule for a user name match
     (a) if they don't match return FALSE;
   (6) check the group membership match
     (a) if they don't match return FALSE;
   (7) Return TRUE and the matching rule.

In a preferred embodiment according to the invention, a Console module is available to configure and create rules and to interact with the Service module. The console is a client application that runs under the context of the logged in user. There are 4 major dialogs in the console.

1. The Main Screen is used to display service status, provides high level rules management (enable/disable), and a launch point for editing rules, generating reports, product configuration and license enforcement;
2. The Rules Screen is used to define/configure the details of a single rule to be used by the service to implement the overall Rules Model;
3. The Generate/Export Report screen is used to extract data from the service. For auditing and tracking it is used to view/export auditing data and provides multiple filtering options. Data can been exported to CSV and XML; and
4. The Configuration screen is used to configure the product. Options include: security access groups, heartbeat pulse rate, Group membership refresh rate, etc. . . . . . In auditing and tracking the audit log consolidation rate and filter type (Wildcard or regular expression) can be defined.
5. At start up, the console makes a connection to the Windows Service singleton.

After the connection is successfully made, the console checks for a valid license and if successful, enters a running state. When the console is in a running state, service statistics are displayed on the main console screen and UI input for allowing access to the other 4 major dialogs.

Figure 3:
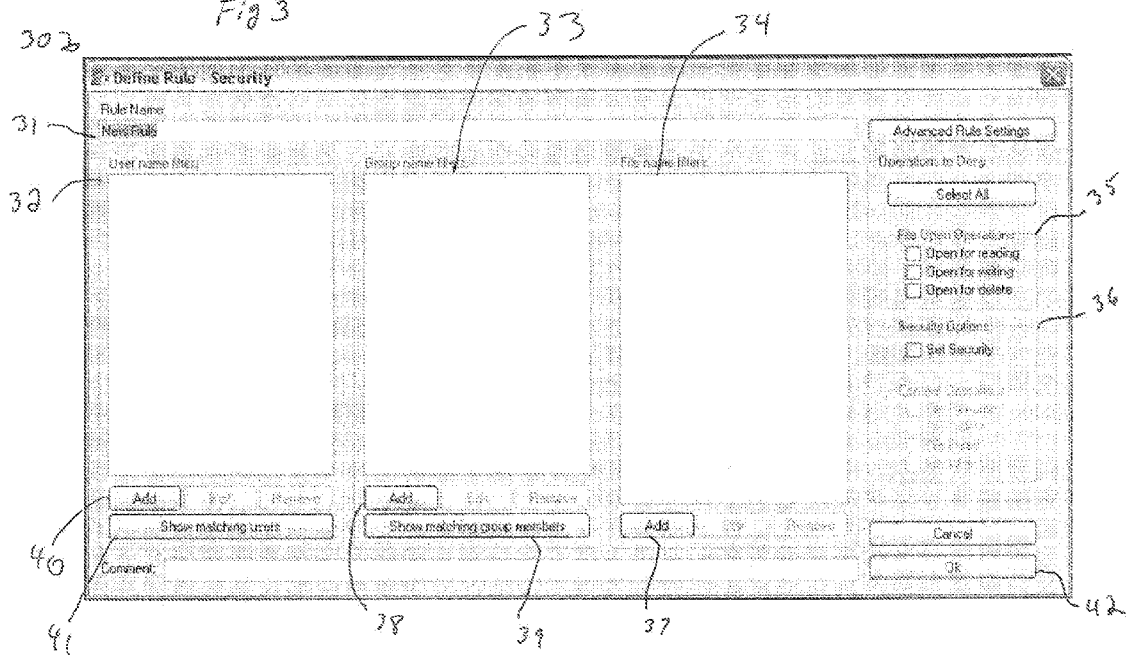
FIG. 3 is an interface of a preferred embodiment according to the invention used to create a security rule.

In a preferred embodiment, FIG. 3 shows a dialogue 30 for creating and editing security rules. A security rule name is input at input 31. A user name description using wild cards etc., is input using add button 40 and appears in list 32. Group name filters and descriptions using wild cards, etc. are input using add button 38 and list 33. File name descriptions using wild cards, etc. are input using add button 37 and list 34. The identification of file operations are input using selectors 35 and 36. When the information is complete button 42 is pressed. The filters used can be tested or the users and groups matching the filters can be determined using buttons 41 and 39.

Figure 4:
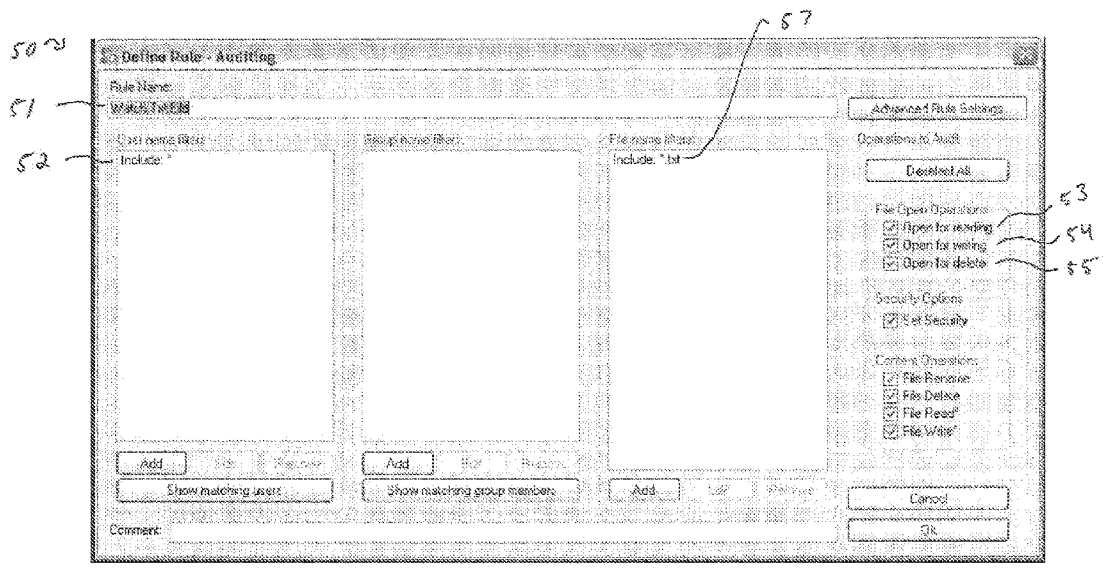
FIG. 4. is an interface of a preferred embodiment according to the invention used to create an auditing rule.

In a preferred embodiment, FIG. 4 shows a dialogue 50 which shows the definition of an auditing rule which will audit any file access for a text file. The rule name 51 is "watch txt file". The user filter is designated with an "*" 52 meaning that it applies to all users. The file name filter 57 shows that it applies to all files having a ".txt" extension. The file operator indicators 53, 54, 55, and 56 show that the rule applies to all operations.

Figure 5:
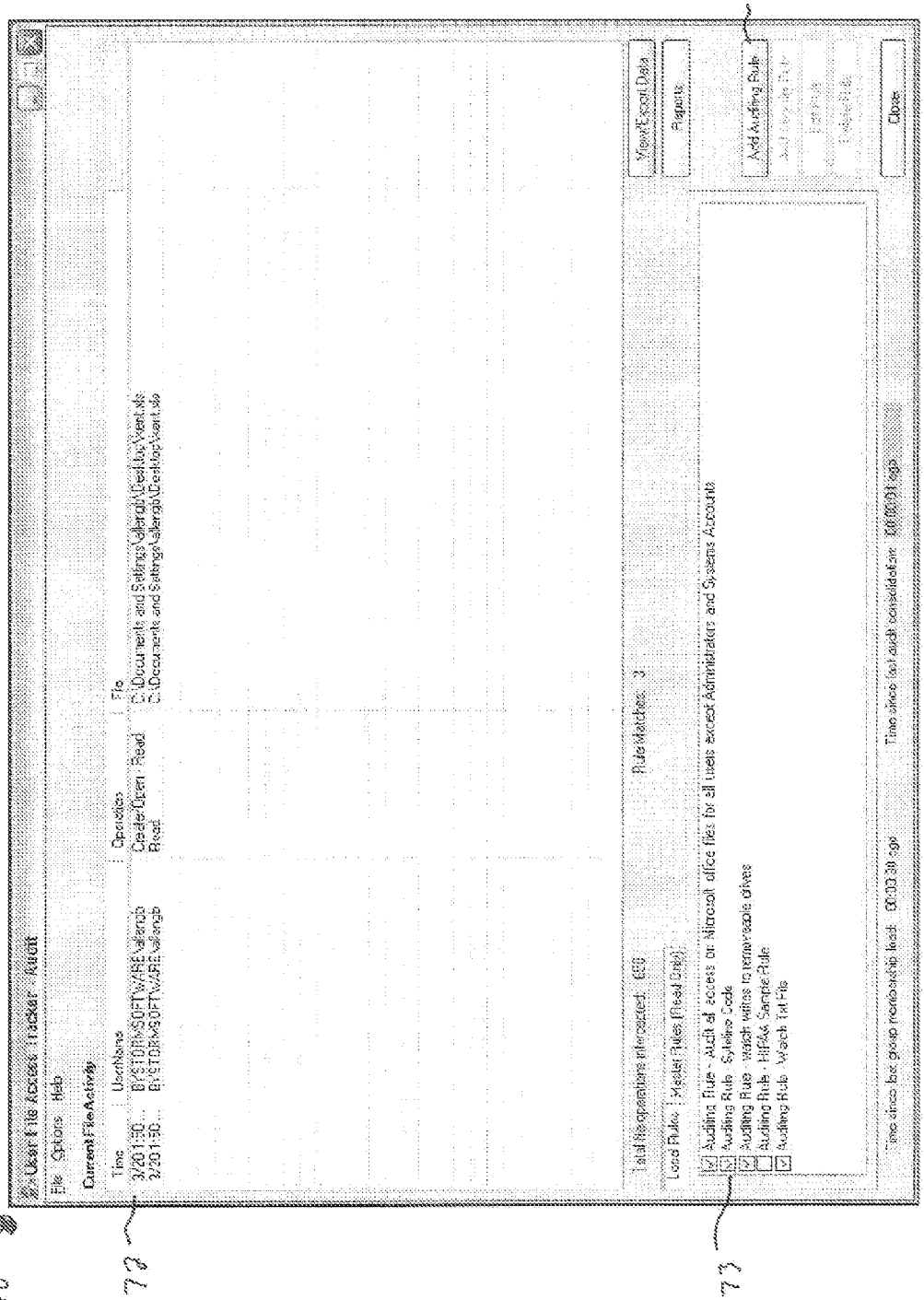
FIG. 5. is an interface of a preferred embodiment according to the invention of the main console.

In a preferred embodiment according to the invention, FIG. 5, shows a dialogue 70 for the main console module. Entries 72 show active file activity. Entries 73 show current rules with an indication of which rules are active. Button 74 is used to indicate that a new rule should be added.

Figure 6:
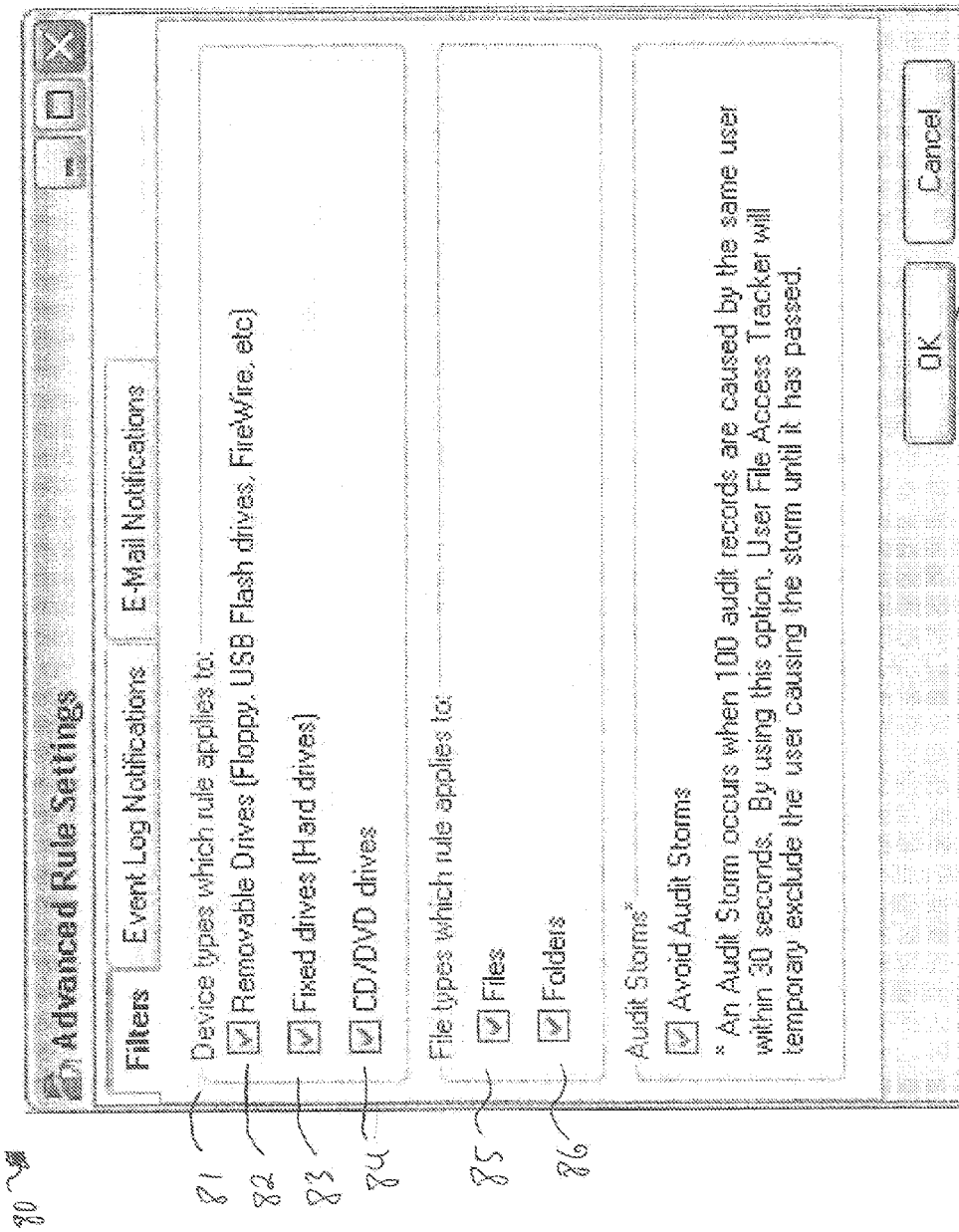
FIG. 6 is an interface of a preferred embodiment according to the invention used to input advanced rule settings.

In a preferred embodiment, FIG. 6 shows a dialogue 80 entitled Advanced Rule Settings. This dialogue accepts input regarding the device types to which the rule applies as indicated in group box 81. Selection 82 for removal drives indicates that the rule should be applied to all removable drives. Selection 83 indicates that the rule should be applied to all fixed drives. Selection 84 indicates that the rule should be applied to CD and DVD drives. Selections 85 and 86 indicate that the rules should be applied to files and folders respectively. Button 87 is used to accept the rule settings.

Figure 8A:
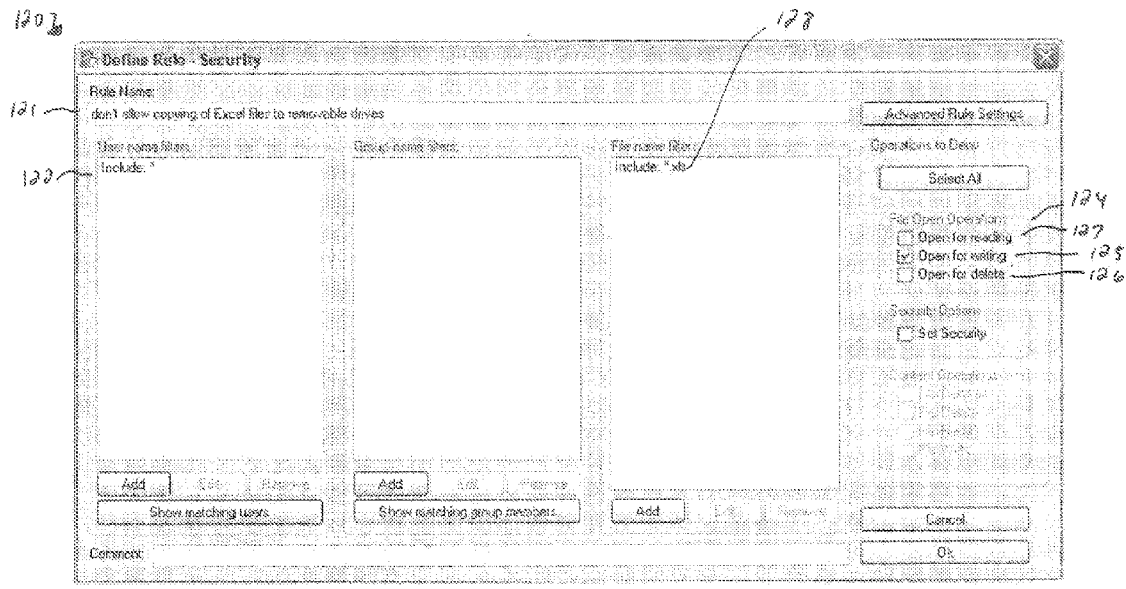
FIG. 8a is an interface of a preferred embodiment according to the invention showing the creation of a security rule prohibiting the copying of files having a ".xls" extension to a removable drive.
Figure 8B:
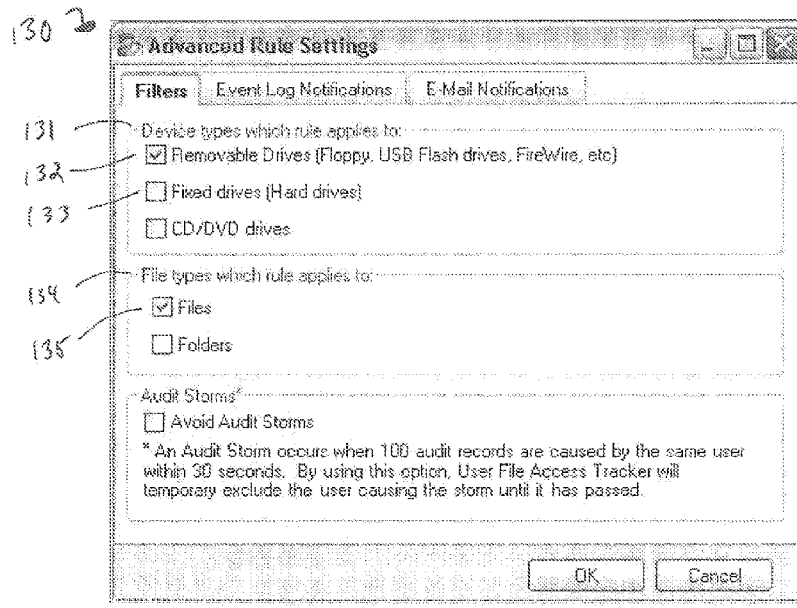

FIGS. 8a and 8b show dialogues 120 and 130 which create a security rule which will result in deny any copying of Excel™ files to a removable drive as indicated in title 121. The file operator indicator 125 in group 124 indicates that the rule only applies to open for writing. Indicators 127 and 126 are unselected. Entry 122 for the user list, indicates that the rule applies to all users. Entry 128 defines the file filter as all files having an extension of ".xls". In FIG. 8b, selector 132 from group 131 indicates that the rule only applies to removable drives. Selectors 132 and 133 are not selected. In group 134, selector 135 is selected to indicate that the rule applies to files.

Figure 7:
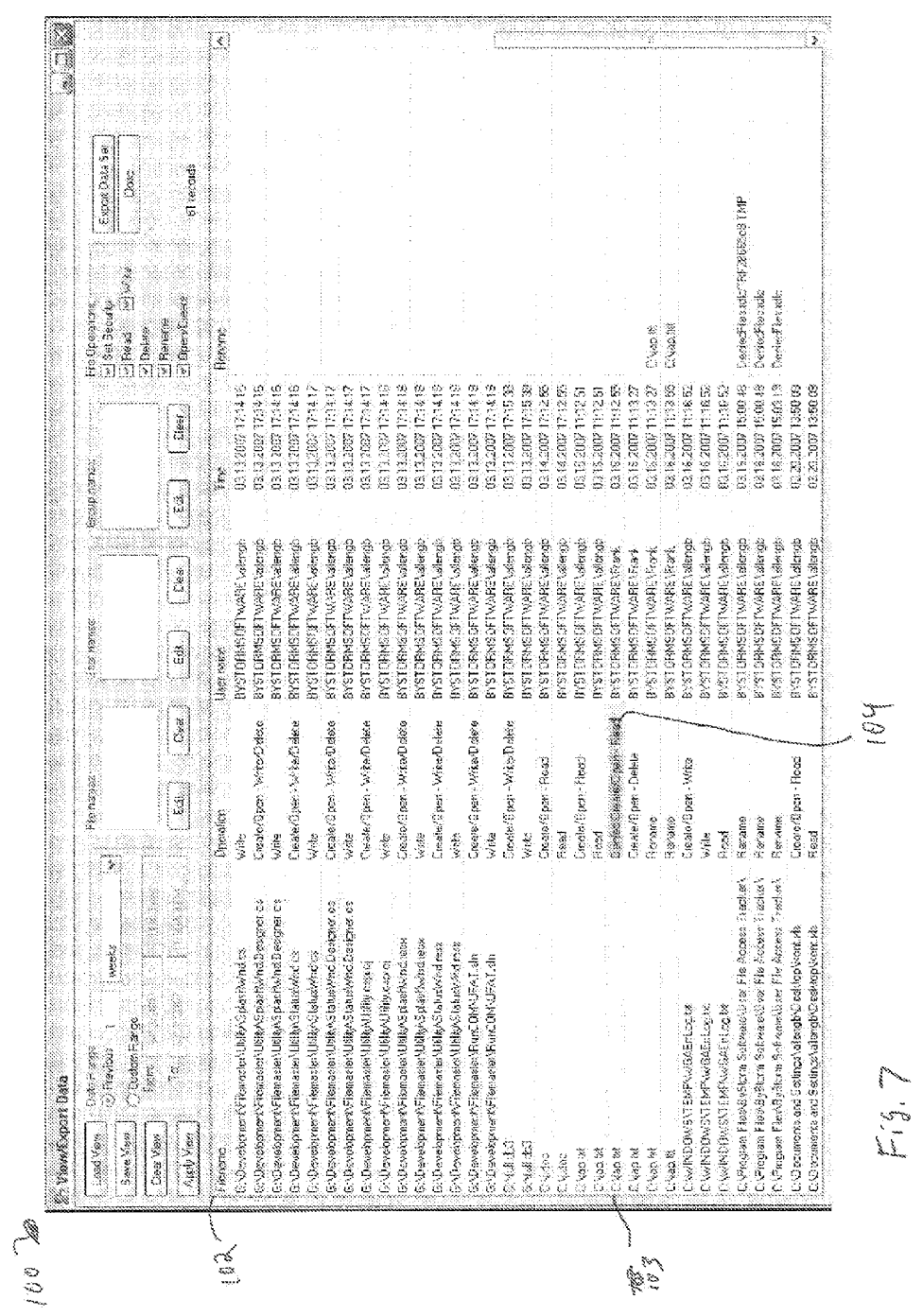

FIG. 7 shows a viewing/export dialogue 100 in a preferred embodiment. List 102 displays the auditing log for all requests that have matched an auditing rule. Entry 103 shows an entry for a request that was denied by the system according to the invention. The operation and result or indicated at entry 104, where the user attempted to create/open the file for reading but was denied.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. In a computer system, having resources and an operating system that provides access to the resources, wherein one of the resources is a computer file system, a method for managing access to computer files stored in the computer file system, the steps comprising:
    creating at least one access rule relationship that comprises a potential user attribute set that applies to all users and contains one or more attributes of a potential user of the computer system, a file access set that applies to all file access operations and contains one or more file access operations, a computer file attribute set that applies to all files and contains one or more attributes of one or more computer files and an action description set that contains an action indication taken from the group of allow access, deny access, allow access and audit, and deny access and audit;
    storing said access rule relationship separate from said the attributes of said potential user and separate from said attributes of said one or more computer files;
    receiving from said operating system, a request by a user of said computer system to access a computer file stored in the file system;
    identifying said user making said request;
    identifying one or more attributes of said user;
    identifying an access operation upon which the request is based;
    identifying one or more attributes of the computer file upon which the request is based;
    defining a requesting user set which comprises the identified attributes of said user, the identified access operation, and the identified attributes of the computer file;
    retrieving said access rule relationship; and
    comparing said access rule relationship and said requesting user set and if said access rule relationship contains an indication of all users or if one or more of the identified attributes of said user is found in the potential user attribute set of said access rule relationship and if said access rule relationship contains an indication of all file access operations or if the identified access operation is found in the file access set of said access rule relationship and if said access rule relationship contains an indication of all files or if one or more of the identified attributes of the computer file is found in the computer file attribute set of said access rule relationship then permitting the access operation according to the action description of said access rule relationship, otherwise denying said request.

2. The method of claim 1, further comprising the steps of: determining whether requests from said user have resulted in a predetermined number of audits within a predetermined time period and if so excluding said user.

3. The method of claim 2, wherein said predetermined number is 100.

4. The method of claim 2, wherein said predetermined time period is 30 seconds.

5. A computer program product, comprising a computer usable medium having a computer readable program code embodied therein, said computer readable program code adapted to be executed to implement a method for controlling access to a computer file stored in a computer file system on a computer system having an operating system, said method comprising:

providing an access creation module and creating at least one access rule relationship that comprises a potential user attribute set that applies to all users and contains one or more attributes of a potential user of the computer system, a file access set that applies to all file access operations and contains one or more file access operations, a computer file attribute set that applies to all files and contains one or more attributes of one or more computer files and an action description set that contains an action indication taken from the group of allow access, deny access, allow access and audit, and deny access and audit;

storing said access rule relationship separate from said attributes of said potential user and separate from said attributes of said one or more computer files;

providing a file access receiving module for interfacing with the operating system, and receiving from the operating system a request by a user of said computer system to access a computer file stored in the file system;

identifying said user making said request;

identifying one or more attributes of said user;

identifying an access operation upon which the request is based;

identifying one or more attributes of the computer file upon which the request is based;

defining a requesting user set which comprises the identified attributes of said user, the identified access operation, and the identified attributes of the computer file;

retrieving said access rule relationship; and comparing said access rule relationship and said requesting user set and if said access rule relationship contains an indication of all users or if one or more of the identified attributes of said user is found in the potential user attribute set of said access rule relationship and if said access rule relationship contains an indication of all file access operations or if the identified access operation is found in the file access set of said access rule relationship and if said access rule relationship contains an indication of all files or if one or more of the identified attributes of the computer file is found in the computer file attribute set of said access rule relationship then permitting the access operation according to the action description of said access rule relationship, otherwise denying said request.

6. A computing apparatus comprising:

a computer processor;

a computer file system configured to store computer files;

a computer operating system configured to provide access to said computer files;

a file access control module coupled to said operating system and configured to receive a request to access a file stored in said computer file system, said request being associated with a user;

said file access control module further comprising:

a Venn rule relationship interface operative for defining at least one Venn access rule relationship set that comprises a potential user attribute set that applies to all users and contains one or more attributes of a potential user of the computer system, a file access set that contains one or more file access operations, a computer file attribute set that contains one or more attributes of one or more computer files and an action description set that contains an action indication taken from the group of allow access, deny access, allow access and audit, and deny access and audit;

a Venn rule relationship storage module operative for storing and retrieving said at least one Venn access rule relationship set, wherein said Venn access rule relationship set is stored separate from said the attributes of said potential user and separate from said attributes of said one or more computer files;

a Venn request module operative to define a Venn request set in response to receiving said request to access a file stored in said computer file system by identifying one or more attributes of said user, and access operation upon which said request is based, and one or more attributes of the file upon which said request is based; and a Venn request test module operative for comparing said at least one Venn access rule relationship set and said Venn request set and performing said action indication from said Venn access rule relationships set when a Venn intersection exists whereby one or more of the identified attributes of said user is found in the potential user attribute set of said access rule relationship and the identified access operation is found in the file access set of said access rule relationship and one or more of the identified attributes of the computer file is found in the computer file attribute set of said access rule relationship.

* * * * *